(12) United States Patent
Ohigawa

(10) Patent No.: US 12,544,153 B2
(45) Date of Patent: Feb. 10, 2026

(54) INDWELLING-TYPE MEDICAL DEVICE AND ENDOSCOPE SYSTEM USING THE SAME

(71) Applicant: Cardinal Health K.K., Tokyo (JP)

(72) Inventor: Atsushi Ohigawa, Shizuoka (JP)

(73) Assignee: Cardinal Health K.K., Tokyo (JP)

( * ) Notice: Subject to any disclaimer, the term of this patent is extended or adjusted under 35 U.S.C. 154(b) by 27 days.

(21) Appl. No.: 18/574,208

(22) PCT Filed: Jun. 17, 2022

(86) PCT No.: PCT/JP2022/024392
§ 371 (c)(1),
(2) Date: Dec. 26, 2023

(87) PCT Pub. No.: WO2023/276736
PCT Pub. Date: Jan. 5, 2023

(65) Prior Publication Data
US 2024/0238051 A1 Jul. 18, 2024

(30) Foreign Application Priority Data
Jun. 30, 2021 (JP) .................................. 2021-108588

(51) Int. Cl.
*A61B 34/20* (2016.01)
*A61B 17/122* (2006.01)
(Continued)

(52) U.S. Cl.
CPC ............ *A61B 34/20* (2016.02); *A61B 17/122* (2013.01); *A61B 90/37* (2016.02);
(Continued)

(58) Field of Classification Search
CPC ........ A61B 34/20; A61B 17/122; A61B 90/37; A61B 90/39; A61B 2034/2051;
(Continued)

(56) References Cited

U.S. PATENT DOCUMENTS

| 6,461,326 B1 | 10/2002 | Yang et al. | |
| 2005/0182318 A1* | 8/2005 | Kaji | A61B 90/39 600/424 |

(Continued)

FOREIGN PATENT DOCUMENTS

| JP | 2014136116 A | 7/2014 |
| JP | 2020124335 A | 8/2020 |

(Continued)

OTHER PUBLICATIONS

International Search Report and Written Opinion mailed Sep. 6, 2022, issued but the International Searching Authority in International Patent Application No. PCT/JP2022/024392.

*Primary Examiner* — Peter Luong
(74) *Attorney, Agent, or Firm* — ArentFox Schiff LLP

(57) ABSTRACT

To provide an indwelling-type medical device capable of obtaining near-infrared light from the entire device by partially using a near-infrared fluorescent material. The indwelling-type medical device includes a first assembly made of a first material containing a fluorescent dye that emits near-infrared light, and a second assembly made of a second material that reflects near-infrared light and that reflects the near-infrared light emitted from the first assembly.

20 Claims, 11 Drawing Sheets

(51) Int. Cl.
*A61B 90/00* (2016.01)
*A61M 25/01* (2006.01)
*A61M 25/10* (2013.01)

(52) U.S. Cl.
CPC .............. *A61B 2034/2051* (2016.02); *A61B 2034/2065* (2016.02); *A61B 2090/3979* (2016.02); *A61M 2025/0166* (2013.01); *A61M 25/10* (2013.01)

(58) Field of Classification Search
CPC .... A61B 2034/2065; A61B 2090/3979; A61B 2090/304; A61B 2090/3941; A61B 2090/397; A61B 1/0011; A61B 1/00009; A61B 1/00082; A61B 1/043; A61B 1/046; A61B 1/0638; A61B 2017/00526; A61M 25/10; A61M 25/0017; A61M 2025/0166; A61M 2025/0088; A61M 2025/1079
See application file for complete search history.

(56) References Cited

U.S. PATENT DOCUMENTS

| | | | |
|---|---|---|---|
| 2010/0020163 | A1 | 1/2010 | Watanabe et al. |
| 2011/0017217 | A1* | 1/2011 | Wood .................. A61M 16/04 128/207.14 |
| 2015/0201902 | A1* | 7/2015 | Zhu ......................... A61B 1/31 600/443 |
| 2019/0082965 | A1* | 3/2019 | Barone .................... A61B 1/01 |
| 2020/0015930 | A1 | 1/2020 | Smith et al. |
| 2021/0045747 | A1* | 2/2021 | Zhong .................. A61B 17/064 |

FOREIGN PATENT DOCUMENTS

| | | | | |
|---|---|---|---|---|
| JP | 2021-069801 A | 5/2021 | | |
| WO | WO2008072579 A1 | 6/2008 | | |
| WO | WO 2019222671 A1 | 11/2019 | | |
| WO | WO-2020247945 A1 * | 12/2020 | ......... A61B 1/00068 |

* cited by examiner

FIG.10

| | MAIN COMPONENT | BARIUM SULFATE | TITANIUM OXIDE |
|---|---|---|---|
| FIRST CATHETER TUBE 21 | POLYURETHANE CONTAINING FLUORESCENT AGENT | PRESENT (20 %) | ABSENT |
| SECOND CATHETER TUBE 22A | POLYURETHANE CONTAINING NO FLUORESCENT AGENT | PRESENT (40 %) | ABSENT |
| CATHETER TUBE 24 CONTAINING NO REFLECTIVE SUBSTANCE | TRANSPARENT POLYURETHANE | ABSENT | ABSENT |

FIG.12

|  | MAIN COMPONENT | BARIUM SULFATE | TITANIUM OXIDE |
|---|---|---|---|
| FIRST CATHETER TUBE 21B | POLYURETHANE CONTAINING FLUORESCENT AGENT | PRESENT (20 %) | ABSENT |
| SECOND CATHETER TUBE 22B | POLYOLEFIN CONTAINING NO FLUORESCENT AGENT | ABSENT | PRESENT | ized through biological tissues, and thus have

INDWELLING-TYPE MEDICAL DEVICE AND ENDOSCOPE SYSTEM USING THE SAME

CROSS-REFERENCE TO RELATED APPLICATION

The present application is a national stage application based on International Patent Application No. PCT/JP2022/024392, filed Jun. 17, 2022, which claims priority to Japanese Patent Application No. 2021-108588, filed Jun. 30, 2021. The disclosures of which are incorporated in its entirety by reference herein.

TECHNICAL FIELD

The present disclosure relates to an indwelling-type medical device, and an endoscope system using the same.

BACKGROUND ART

Near-infrared light and near-infrared fluorescence are transmitted through biological tissues, and thus have attracted attention as light for visualizing the inside of a living body, such as a lymphatic vessel, a blood vessel, or an organ. Indocyanine green (ICG) has been used as a near-infrared fluorescent dye. When the ICG is irradiated with near-infrared light, ICG molecules are excited and emit near-infrared fluorescence having a slightly longer wavelength than the irradiated near-infrared light.

A configuration has been proposed in which an ICG mixture is injected into a balloon catheter to inflate the balloon, and the position of the balloon is identified by imaging fluorescence from the ICG (for example, see Patent Document 1). Since ICG has low heat resistance and is structurally unstable, it is difficult to knead ICG into a resin or the like. Further, sufficient fluorescence luminance may not be obtained.

A method of producing a urethral catheter or other molded articles by kneading a near-infrared fluorescent dye other than ICG into a polymer or a resin is known (see, for example, Patent Document 2 and Patent Document 3).

RELATED ART DOCUMENTS

Patent Documents

Patent Document 1: Japanese Unexamined Patent Publication No. 2018-143667
Patent Document 2: Japanese Unexamined Patent Publication No. 2014-136116
Patent Document 3: Japanese Unexamined Patent Publication No. 2016-192997

SUMMARY OF THE INVENTION

Problems to be Solved by the Invention

Depending on the type of resin into which the near-infrared fluorescent material is kneaded, the required fluorescent properties may not be obtained. For example, a general Foley catheter including a balloon is made of silicone or latex, and even when the near-infrared fluorescent material described in Patent Document 2 or 3 is kneaded into these resin materials, fluorescence is not appreciably obtained. On the other hand, there are situations where light from the balloon is required. This is because the visualization of the balloon shape by fluorescence enables the identification of the position of the organ in which the balloon is placed, and the observation and surgery of the organ in the vicinity of the balloon. Not only for balloon catheters but also for general indwelling-type medical devices, if near-infrared light can be obtained from the entire device without applying an expensive near-infrared fluorescent material to the entire device to be used, the entire device can be observed while reducing the cost.

In one aspect of the embodiments, an indwelling-type medical device includes a first assembly made of a first material containing a fluorescent dye that emits near-infrared light, and a second assembly made of a second material that reflects near-infrared light and that reflects the near-infrared light emitted from the first assembly.

Effects of the Invention

An indwelling-type medical device is realized in which near-infrared light is obtained from the entire device without using a near-infrared fluorescent material for the entire device.

BRIEF DESCRIPTION OF THE DRAWINGS

FIG. 10 is a diagram illustrating the specifications of a catheter tube set used in Experiment 1.
FIG. 12 is a diagram illustrating the specifications of a catheter tube set used in Experiment 2 of the second embodiment.

EMBODIMENT OF THE INVENTION

Figure 1:
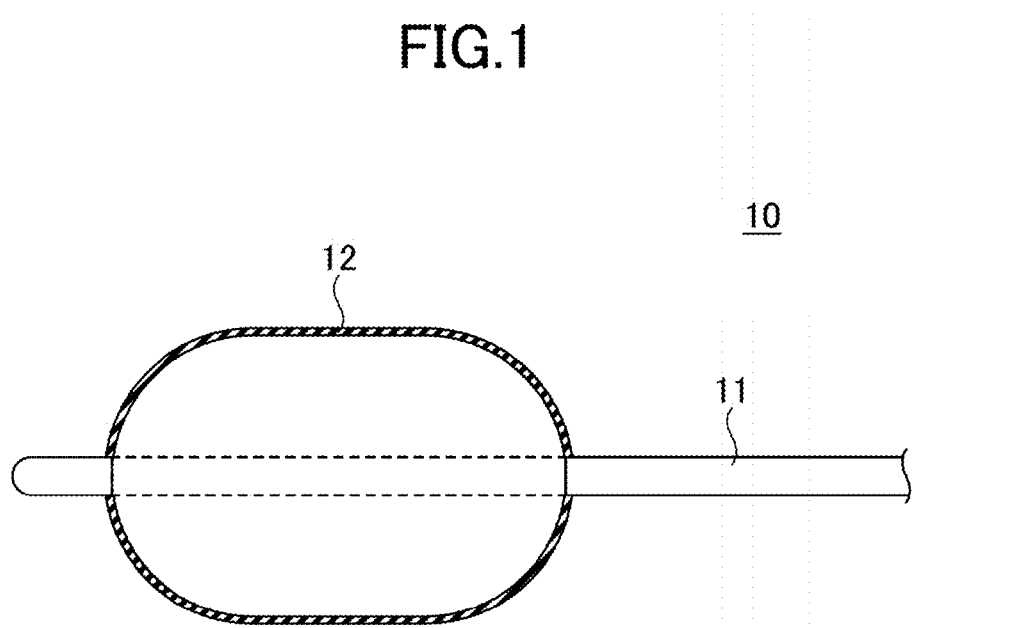
FIG. 1 is a schematic view of a balloon catheter as an example of an indwelling-type medical device according to a first embodiment.

Hereinafter, embodiments of the present disclosure will be described with reference to the drawings. In the figures, the same components are denoted by the same reference numerals, and redundant description may be omitted.

In the embodiments, a near-infrared fluorescent dye is applied to a first assembly included in an indwelling-type medical device, and a near-infrared fluorescent dye is not added to a second assembly disposed in the vicinity of the first assembly. The second assembly is made of a material containing a reflective substance that reflects the near-infrared fluorescence from the first assembly. When the indwelling-type medical device is illuminated with excitation light, the first assembly emits near-infrared fluorescence and the second assembly reflects the near-infrared fluorescence from the first assembly. Thus, even if the near-infrared fluorescent dye is not added to the second assembly, fluorescence can be obtained from the entire indwelling-type medical device.

First Embodiment

FIG. 1 is a schematic view of a balloon catheter which is an indwelling-type medical device according to a first embodiment. The balloon catheter 10 includes a catheter tube 11 and a balloon 12 provided on the outer periphery of the catheter tube 11. The catheter tube 11 is an example of a first assembly and is made of a material containing a near-infrared fluorescent dye. The balloon 12 is an example of a second assembly and does not contain a near-infrared fluorescent dye. The balloon 12 contains a substance that reflects near-infrared fluorescence from the catheter tube.

Although the balloon 12 is illustrated in an inflated state in FIG. 1, the balloon 12 in a deflated state is provided on the outer periphery of the catheter tube 11 before the balloon catheter 10 is used. The balloon 12 is inflated after the catheter tube 11 is inserted into a predetermined position in the body.

The catheter tube 11 is a resin tube, and a near-infrared fluorescent dye is kneaded into the resin. As the resin material, a polyurethane resin, a polyamide resin, a polyethylene resin, a fluororesin, or the like can be used. The surface of these resins may be coated with a hydrophilic coating which is transparent to near-infrared light. Depending on the part where the balloon catheter 10 is used, a material having relatively high rigidity such as polypropylene resin or polycarbonate resin may be used.

As the near-infrared fluorescent dye to be kneaded with the resin, a known near-infrared fluorescent material can be used. For example, the dyes described in Patent Document 2 or Patent Document 3 may be used. Specifically, dyes such as polymethylene dyes, phthalocyanine dyes, naphthoquinone dyes, anthraquinone dyes, dithiol metal complex salts, azo dyes, and triarylmethane dyes can be used. In practice, the combination of the resin and the near-infrared fluorescent dye to be used may be appropriate or inappropriate, and a fluorescent dye that can obtain near-infrared fluorescence with sufficient luminance may be selected according to the resin material to be used.

In the embodiment, as an example, a polyurethane resin is used as the resin material of the catheter tube 11, and a heat-resistant near-infrared fluorescent dye that can be kneaded with the polyurethane resin is used among the dyes described above. This near-infrared fluorescent dye has fluorescence characteristics similar to those of ICG which is generally used.

The balloon 12 is made of a highly stretchable material such as silicone rubber, synthetic rubber, polyurethane elastomer, or polyamide elastomer. As the synthetic rubber, styrene-butadiene polymers, polybutadiene, methyl methacrylate-butadiene polymers, acrylonitrile-butadiene polymers, and the like are used. The balloon 12 is made of a material which is not kneaded with a near-infrared fluorescent material but is mixed with a reflective substance which reflects near-infrared fluorescence from the catheter tube 11.

As the reflective substance, bismuth carbonate, barium sulfate, silicon oxide, titanium oxide, bismuth oxide, zirconium oxide, bismuth nitrate, fluororesin, polytetrafluoroethylene (PTFE), or the like can be used. By mixing these reflective substances into the material of the balloon 12, even if the balloon 12 does not contain a near-infrared fluorescent dye, when the balloon catheter 10 is irradiated with excitation light, fluorescence from the catheter tube 11 is reflected, and visualization is possible.

Figure 2:
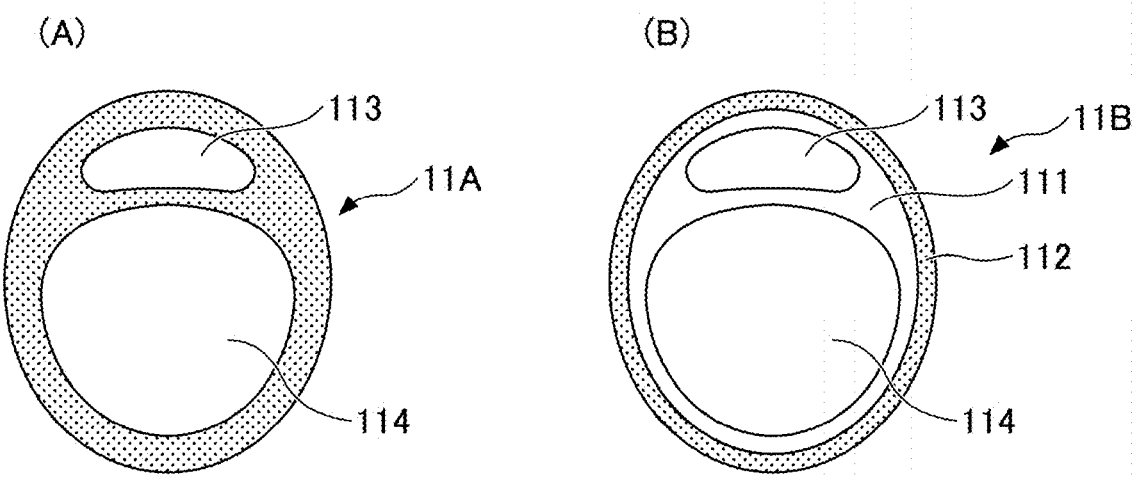
FIG. 2 is a schematic sectional view of a configuration example of a catheter tube used in the balloon catheter of FIG. 1.

FIG. 2 is a schematic sectional view of the catheter tube 11. The catheter tube 11A illustrated in (A) of FIG. 2 is entirely made of a plastic material in which a near-infrared fluorescent dye is kneaded. The catheter tube 11A has a first lumen 113 and a second lumen 114. The first lumen 113 is used to inflate or deflate the balloon 12. When the balloon catheter 10 is inserted into a predetermined position in the body, a branched funnel is connected to the end portion of the catheter tube 11A opposite to the balloon 12, and a liquid such as sterilized distilled water or a gas such as air is injected into the first lumen 113 to inflate the balloon 12.

The second lumen 114 is a lumen for suctioning a body fluid. When the balloon catheter 10 is used as a urinary catheter, the second lumen 114 is used for urine outflow. The double-lumen type catheter tube illustrated in FIG. 2 is an example, and the catheter tube may be a single-lumen type or a triple-lumen type according to the purpose of use of the balloon catheter 10.

The catheter tube 11B in (B) of FIG. 2 has a two layer structure of an inner layer 111 and an outer layer 112. The near-infrared fluorescent dye is kneaded only in the outer layer 112. The configuration in (B) of FIG. 2 can reduce the amount of the near-infrared fluorescent dye used, and can reduce the manufacturing cost.

A reflective substance that reflects near-infrared fluorescence may be added to the inner layer 111. This two layer structure can be applied to a single lumen and a triple lumen.

Figure 3:
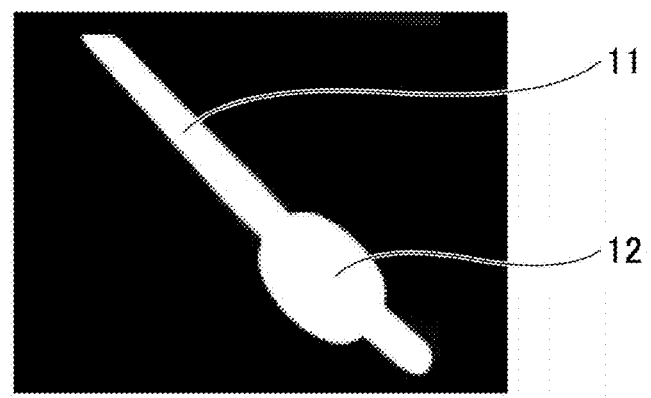
FIG. 3 is a near-infrared image of a balloon catheter actually produced.

FIG. 3 is an image of the balloon catheter 10 observed by a near-infrared camera. The outer diameter of the catheter tube 11 of the balloon catheter 10 is 10 mm; the balloon 12 is made of silicone and bismuth carbonate is added as a reflective substance. The concentration of bismuth carbonate added is approximately 25% by weight. An image is obtained by irradiating the balloon catheter 10 with generally used near-infrared light for ICG and capturing fluorescence from the balloon catheter 10 with a near-infrared camera for ICG.

Although the near-infrared fluorescent dye is kneaded only in the catheter tube 11, the shape of the balloon 12 is clearly captured. This is because the near-infrared camera detects the near-infrared fluorescence from the catheter tube 11 and also detects reflected light that is reflected by the balloon 12.

Figure 4:
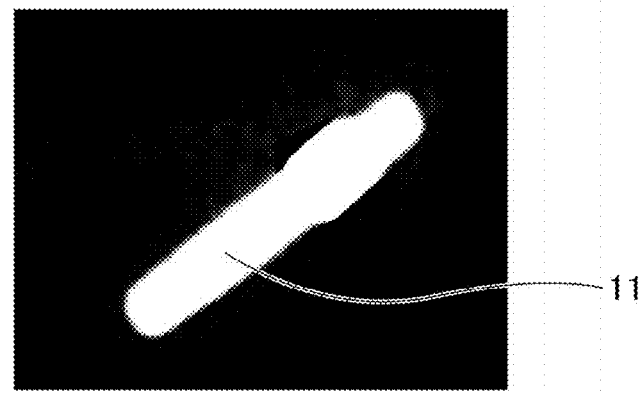
FIG. 4 is a near-infrared image when a balloon containing no reflective substance is used as a first comparative example.

FIG. 4 is a near-infrared image illustrating a first comparative example. In the first comparative example, the near-infrared fluorescent dye is kneaded in the catheter tube 11, but neither the near-infrared fluorescent dye nor the reflective substance is mixed in the balloon. The catheter tube 11 is a polyurethane tube containing a near-infrared fluorescent dye, as in FIG. 3. When the balloon catheter is irradiated with near-infrared light, only near-infrared fluorescence from the catheter tube 11 is observed. In practice, the balloon is inflated on the outer periphery of the catheter tube 11, but the balloon cannot be visualized even when the near-infrared light for excitation is irradiated because the balloon does not contain the near-infrared fluorescent dye and the reflective substance.

Figure 5:
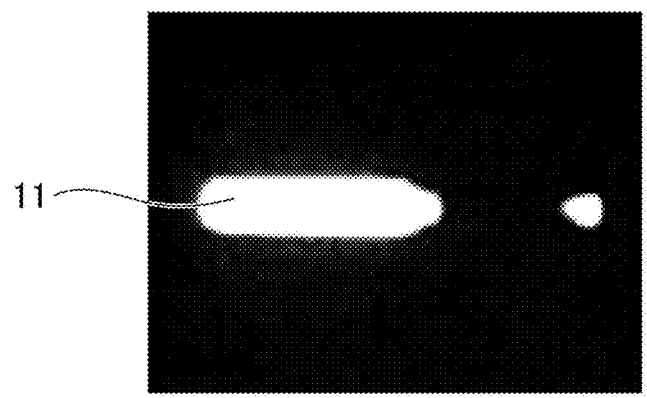
FIG. 5 is a near-infrared image when a balloon contains a reflective substance and a catheter tube inside the balloon is covered with a near-infrared shielding film, as a second comparative example.

FIG. 5 is a near-infrared image illustrating a second comparative example. In the second comparative example, the balloon 12 is made of silicone mixed with bismuth carbonate, and the catheter tube 11 is made of polyurethane resin kneaded with a near-infrared fluorescent dye. However, the surface of the catheter tube 11 in the portion positioned inside the balloon 12 is covered with a shielding film. The shielding film is an absorption film that absorbs light having a near-infrared wavelength.

When the entire balloon catheter is irradiated with near-infrared excitation light, near-infrared fluorescence is generated from the catheter tube 11 in the portion not covered with the shielding film, and the near-infrared fluorescence can be observed by a near-infrared camera, but an image of the portion covered with the shielding film cannot be obtained. Although the balloon 12 is mixed with a reflective substance that reflects near-infrared fluorescence from the catheter tube 11, fluorescence cannot be obtained because the catheter tube 11 at a portion facing the balloon 12 is covered with a shielding film. Since there is no fluorescence from the catheter tube 11 at the portion facing the balloon 12, the balloon cannot be visualized even when the balloon 12 containing a reflective substance is used.

Figure 6:
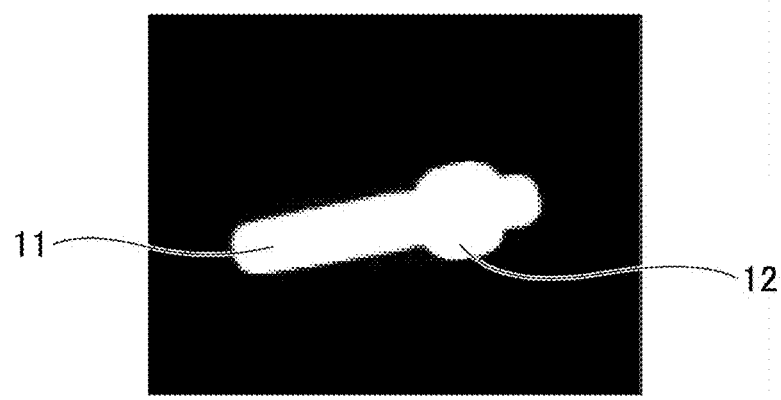
FIG. 6 is a near-infrared image of another balloon catheter according to the first embodiment.

FIG. 6 is an image of another balloon catheter 10 captured by a near-infrared camera. The outer diameter of the catheter tube 11 of the balloon catheter 10 is 10 mm; the balloon 12 is made of a polyurethane elastomer and barium sulfate is added as a reflecting material. The concentration of barium sulfate added is 20% by weight. The balloon catheter 10 is irradiated with generally used near-infrared light for ICG, and fluorescence from the balloon catheter 10 is captured by a near-infrared camera for ICG. Although the near-infrared fluorescent dye is kneaded only in the catheter tube 11, the shape of the balloon 12 is clearly captured. This is because the infrared camera detects the reflected light reflected by the balloon 12 together with the near-infrared fluorescence from the catheter tube 11.

The observation results of FIGS. 3 to 6 indicate that the entire balloon catheter 10 can be visualized by mixing into the balloon 12 a reflective substance that reflects fluorescence from the catheter tube 11 even if the balloon 12 is not mixed with a near-infrared fluorescent dye.

Figure 7:
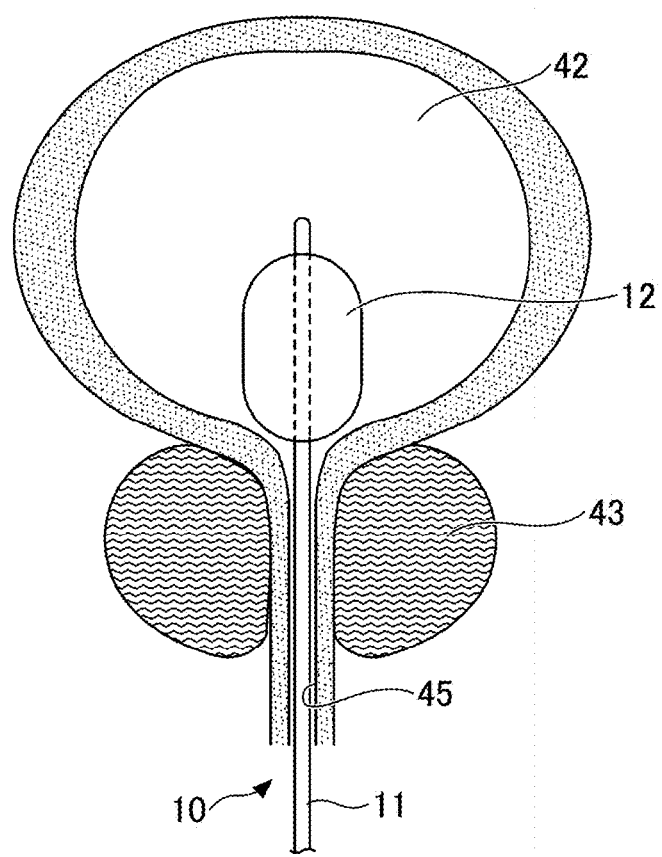
FIG. 7 is a schematic view illustrating an example of use of the balloon catheter according to the first embodiment.

FIG. 7 is a schematic view illustrating an example of use of the balloon catheter 10 of the first embodiment. The balloon catheter 10 is inserted into the bladder 42 through the urethra 45 with the balloon 12 uninflated. Once the balloon catheter 10 is inserted into position, the balloon 12 is inflated. Inflation of the balloon 12 causes the balloon catheter 10 to remain at the entrance of the bladder 42.

By irradiating the balloon catheter 10 with near-infrared light, fluorescence can be obtained from both the catheter tube 11 and the balloon 12. As described above, the fluorescence from the balloon 12 is reflected fluorescence, in which fluorescence from the catheter tube 11 is reflected. By observing the fluorescence from the catheter tube 11 and the balloon 12, the position of the urethra 45, the boundary between the urethra 45 and the bladder 42, the boundary between the urethra 45 and the prostate 43, and the like can be specified.

The balloon catheter 10 is applicable not only to a urethral catheter but also to a ureteral catheter. In this case, the diameter of the catheter tube 11 is smaller than that of the urinary catheter, but the near-infrared fluorescent dye can be kneaded into the catheter tube 11. By adding to the balloon 12 a reflective substance that reflects fluorescence from the catheter tube 11, both the catheter tube 11 and the balloon 12 can be visualized. Since the position of the ureter and the boundary between the ureter and the kidney can be visualized, damage to the ureter and the kidney can be reduced during surgery.

The balloon catheter 10 may be applied to a catheter for a blood vessel. When a blood vessel is dilated by the balloon 12, or hemostasis is assisted by the balloon 12, the balloon 12 reflects fluorescence from the catheter tube 11, and thus a target internal part of the body can be clearly monitored.

Second Embodiment

Figure 8:
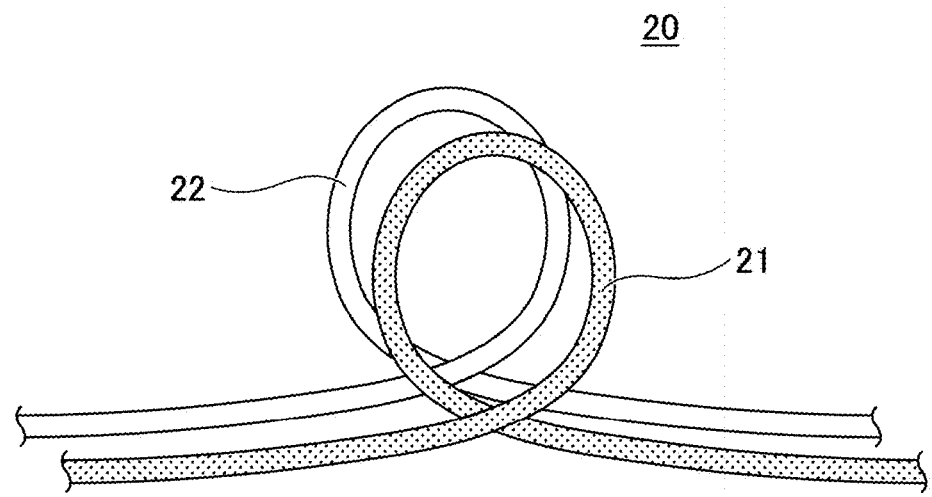
FIG. 8 is a schematic view of a catheter tube set as an example of the indwelling-type medical device according to a second embodiment.

FIG. 8 is a schematic view of a catheter tube set which is an indwelling-type medical device according to a second embodiment. The catheter tube set 20 includes a first catheter tube 21 as a first assembly and a second catheter tube 22 as a second assembly. The second catheter tube 22 is provided in parallel with the first catheter tube 21.

Depending on the purpose and the site of use of the catheter tube, it is sometimes desired to use not only one tube but also two tubes in parallel for observation with the near infrared camera. By kneading the near-infrared fluorescent dye into only one of the catheter tubes instead of kneading the near-infrared fluorescent dye into both of the catheter tubes, the amount of the near-infrared fluorescent dye used can be reduced, and the cost can be reduced.

For example, the first catheter tube 21 is made of a resin in which a near-infrared fluorescent dye is kneaded, and the second catheter tube 22 is made of a resin to which a near-infrared fluorescent dye is not added. A substance that reflects the near-infrared fluorescence from the first catheter tube 21 is added to the second catheter tube 22. The resin materials that act as base materials of the first catheter tube 21 and the second catheter tube 22 may be the same or different.

The first catheter tube 21 is made of a polyurethane resin, polyamide resin, polyethylene resin, fluororesin, polypropylene resin, polycarbonate resin, polynethyl methacrylate (PMMA), polyethylene terephthalate (PET), polystyrene (PS), or the like.

As the near-infrared fluorescent dye that can be kneaded with the resin, a known near-infrared fluorescent material is used. As in the first embodiment, a dye such as a polymethylene dye, a phthalocyanine dye, a naphthoquinone dye, an anthraquinone dye, a dithiol metal complex salt, an azo dye, or a triarylmethane dye can be used. As described above, it is desirable to select a combination of a resin material and a near-infrared fluorescent material that can provide high-luminance near-infrared fluorescence.

The first catheter tube 21 may be entirely made of a resin kneaded with a near-infrared fluorescent dye, or may have a two layer structure of an outer layer and an inner layer as illustrated in (B) of FIG. 2, in which only the outer layer contains a near-infrared fluorescent dye. A reflective substance that reflects near-infrared fluorescence may be added to the inner layer.

The second catheter tube 22 may be made of the same material as that used for the first catheter tube 21, or may be made of a silicone rubber, synthetic rubber, polyurethane elastomer, polyamide elastomer, or the like. The second catheter tube 22 is not kneaded with a near-infrared fluorescent material, but is mixed with a reflective substance that reflects near-infrared fluorescence.

The reflective substance is bismuth carbonate, barium sulfate, silicon oxide, titanium oxide, bismuth oxide, zirconium oxide, bismuth nitrate, fluororesin, polytetrafluoroethylene (PTFE), or the like, as in the first embodiment. By arranging the second catheter tubes 22 in parallel with the first catheter tube 21, within a range where fluorescence from the first catheter tube 21 reaches, reflected fluorescence can be obtained from the second catheter tubes 22.

The lumen types of the first catheter tube 21 and the second catheter tube may be the same or different. A combination of a single-lumen catheter tube and a double-lumen catheter tube, a combination of a single-lumen catheter tube and a triple-lumen catheter tube, or the like is appropriately selected according to the purpose of use of the catheter tube set 20, a substance to be flowed into and out of the lumen, or the like.

Figure 9:
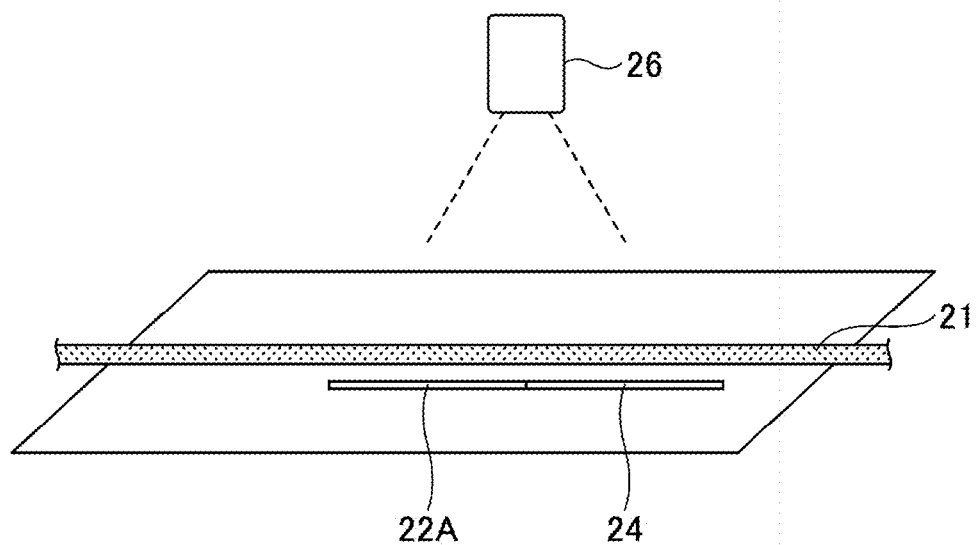
FIG. 9 is a setup diagram of Experiment 1 for examining reflection of near-infrared fluorescence in the second embodiment.

FIG. 9 is a setup diagram of Experiment 1 for examining the reflection of near-infrared fluorescence in the second embodiment. In Experiment 1, a second catheter tube 22A containing no near-infrared fluorescent dye but a material reflecting near-infrared fluorescence is disposed in parallel with the first catheter tube 21 containing a near-infrared fluorescent dye. For comparison, a catheter tube 24 containing neither the near-infrared fluorescent dye nor the reflective substance is disposed in parallel with the first catheter tube. The three catheter tubes are irradiated with near-infrared light from above by the near-infrared light source 26, and fluorescence and reflection are observed.

FIG. 10 illustrates the specifications of the catheter tube set used in Experiment 1. The first catheter tube 21 is made of a polyurethane resin containing a near-infrared fluorescent dye (in the figure, described as "containing fluorescent agent"). The lumen of the first catheter tube 21 may include a portion to which 20% by weight of barium sulfate is added. The second catheter tube 22A is made of a polyurethane polymer that does not contain a near-infrared fluorescent dye (in the figure, indicated as "containing no fluorescent agent"). The second catheter tube 22A contains 40 wt % of barium sulfate as a reflective substance.

The catheter tube 24 of the comparative example is made of a transparent polyurethane resin and does not contain a near-infrared fluorescent dye or a reflective substance. Titanium oxide in the figure is one of the reflective substances that reflect near-infrared fluorescence, but titanium oxide is not used in Experiment 1.

Figure 11A:
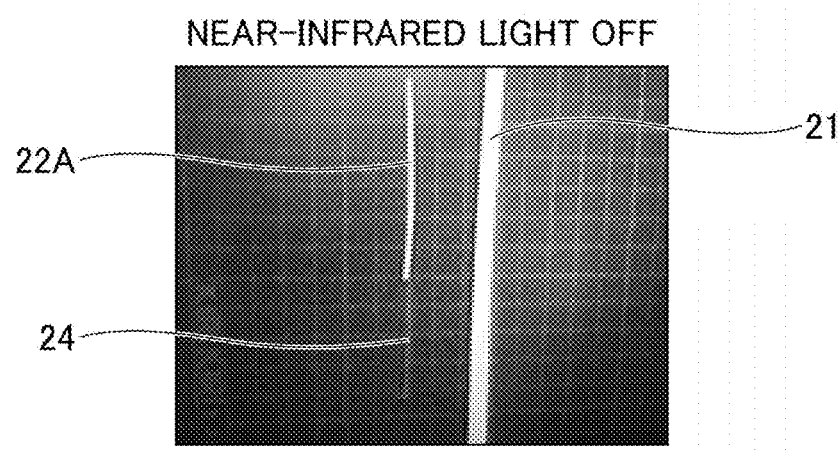
FIG. 11A is an image when near-infrared light is turned off in Experiment 1.

FIG. 11A illustrates an image when the near-infrared light is turned off in Experiment 1. The image in FIG. 11A is captured by a normal visible light camera, and an image of the transparent catheter tube 24 that is arranged on a stage with grid lines is also obtained. Since the near-infrared light source is OFF, the near-infrared fluorescent material contained in the first catheter tube 21 is not excited and does not emit fluorescence. Since the first catheter tube 21 does not emit fluorescence, reflection by the second catheter tube 22A does not occur.

Figure 11B:
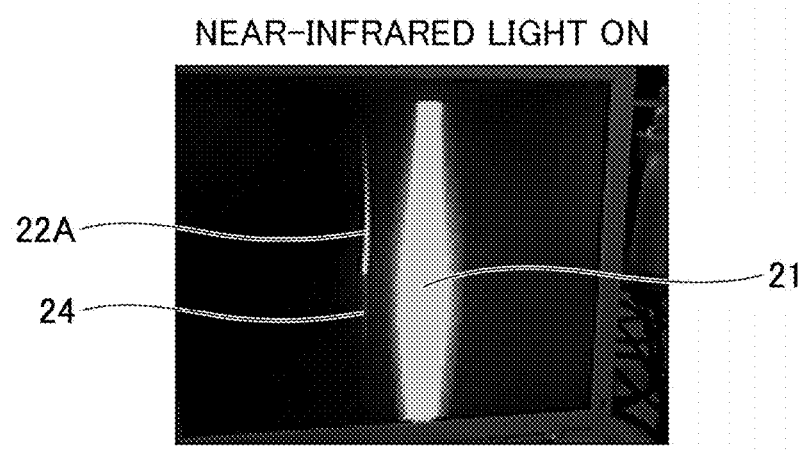
FIG. 11B is an image when near-infrared light is turned on in Experiment 1.

FIG. 11B is an image when the near-infrared light is turned on in Experiment 1. The image in FIG. 11B is captured by a general near-infrared camera for ICG. The near-infrared fluorescent material contained in the first catheter tube 21 is excited and emits bright fluorescence. The second catheter tube 22A does not contain a near-infrared fluorescent material, but contains a reflective substance that reflects near-infrared fluorescence, and therefore light reflected by the second catheter tube 22A is observed. The presence and position of the second catheter tube 22A can be known from the reflection light.

In the catheter tube 24 of the comparative example, neither fluorescence nor reflection occurs even when the near-infrared light is turned on, and nothing is detected as a near-infrared image. Experiment 1 indicates that even when the second catheter tube 22A does not contain a near-infrared fluorescent dye, visualization can be performed using fluorescence from the first catheter tube 21 by containing a material that reflects near-infrared fluorescence. The effect of adding the reflective substance is also indicated from the fact that the presence of the catheter tube 24 of the comparative example containing no reflective substance is not detected.

FIG. 12 illustrates the specifications of the catheter tube set used in Experiment 2 of the second embodiment. In Experiment 2, a first catheter tube 21 is made of a polyurethane resin containing a near-infrared fluorescent dye, as in Experiment 1. The first catheter tube 21 may be partially made of a resin containing 20% by weight of barium sulfate. A second catheter tube 22B is made of a polyolefin which does not contain a near-infrared fluorescent material. The second catheter tube 22B contains titanium oxide as a reflective substance.

Figure 13A:
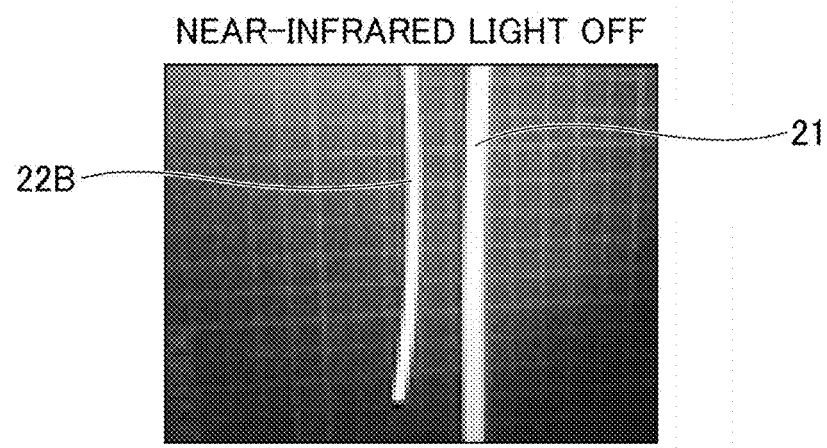
FIG. 13A is an image when near-infrared light is turned off in Experiment 2.
Figure 13B:
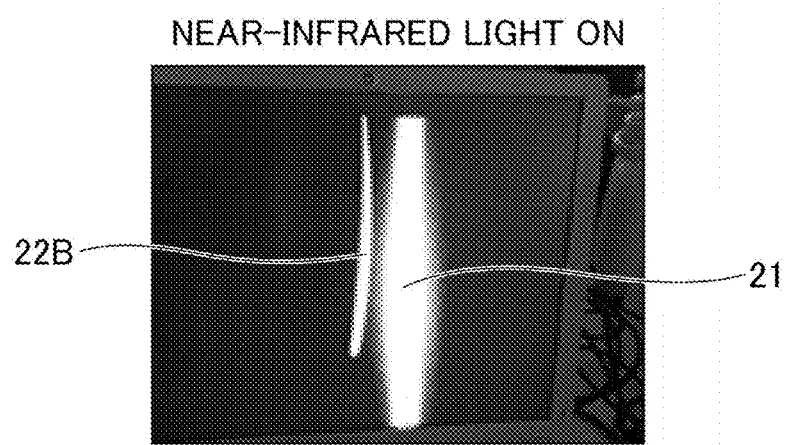
FIG. 13B is an image when near-infrared light is turned on in Experiment 2.

FIG. 13A illustrates an image when the near-infrared light is turned off in Experiment 2, and FIG. 13B illustrates an image when the near-infrared light is turned on. The image in FIG. 13A is captured by a normal visible light camera, and the appearance of the first catheter tube 21 and the second catheter tube 22B that are arranged on a stage with grid lines is captured. In FIG. 13B, the first catheter tube 21 emits fluorescence by turning on the near-infrared light. The second catheter tube 22B does not contain a near-infrared fluorescent material, but the presence and position of the inner wall of the second catheter tube are detected by reflecting the fluorescence from the first catheter tube 21. The effect of adding a substance that reflects near-infrared fluorescence to the second assembly is also indicated from Experiment 2.

The number of catheter tubes used simultaneously is not limited to two. The catheter tube set 20 may include three catheter tubes used in parallel in close proximity to each other. In this case, too, all the catheter tubes can be visualized by mixing a near-infrared fluorescent dye into only one of the catheter tubes and kneading a reflective substance that reflects near-infrared fluorescence into the other two catheter tubes.

According to the configuration of the second embodiment, by kneading the near-infrared fluorescent dye into one catheter tube, the presence and position of the other catheter tube can be visualized. This enables observation and surgery with reduced cost and reduced damage to internal organs.

Third Embodiment

Figure 14:
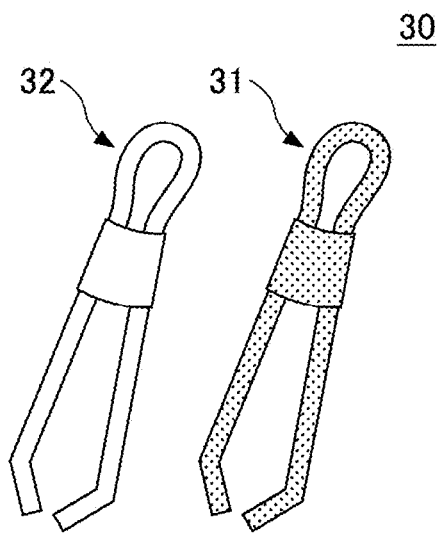
FIG. 14 is a schematic view of an endoscope clip set which is an example of the indwelling-type medical device according to a third embodiment.

FIG. 14 is a schematic view of an endoscope clip set 30 which is an indwelling-type medical device according to a third embodiment. The endoscope clip set 30 includes a first clip 31 as a first assembly and a second clip 32 as a second assembly. The first clip 31 is made of a resin in which a near-infrared fluorescent dye is kneaded. The second clip 32 is made of a resin to which a near-infrared fluorescent dye is not added, but to which a reflective substance that reflects near-infrared fluorescence from the first clip 31 is added. The resin materials that are the base materials of the first clip 31 and the second clip 32 may be the same or different.

The first clip 31 and the second clip are desirably made of a resin having both elasticity and rigidity in order to grip the body tissue at a target location for hemostasis, suturing, or the like. The first clip 31 and the second clip are made of polyether ether ketone (PEEK), polypropylene resin, polycarbonate resin, polynethyl methacrylate (PMMA), polyethylene terephthalate (PET), polystyrene (PS), or the like.

The near-infrared fluorescent dye kneaded into the first clip 31 is a dye such as a polymethylene dye, a phthalocyanine dye, a naphthoquinone dye, an anthraquinone dye, a dithiol metal complex salt, an azo dye, or a triarylmethane dye, as in the first embodiment and the second embodiment. It is desirable to provide desired fluorescence characteristics by appropriately selecting a combination of the resin and the near-infrared fluorescent dye to be used.

The first clip 31 may be entirely made of a resin containing a near-infrared fluorescent dye, or a part of the first clip 31 may be made of a resin containing a near-infrared fluorescent dye and the remaining part may be made of a metal such as stainless steel. The second clip 32 may be made of the same material as the first clip 31 or may be made of a material different from the first clip 31. The second clip 32 is not kneaded with the near-infrared fluorescent material, but is mixed with a reflective substance that reflects near-infrared fluorescence.

The reflective substance is bismuth carbonate, barium sulfate, silicon oxide, titanium oxide, bismuth oxide, zirconium oxide, bismuth nitrate, fluororesin, polytetrafluoroethylene (PTFE), or the like, as in the first embodiment. By disposing the second clip 32 in a range where the fluorescence from the first clip 31 reaches, the reflected fluorescence can be obtained from the second clip 32.

Figure 15:
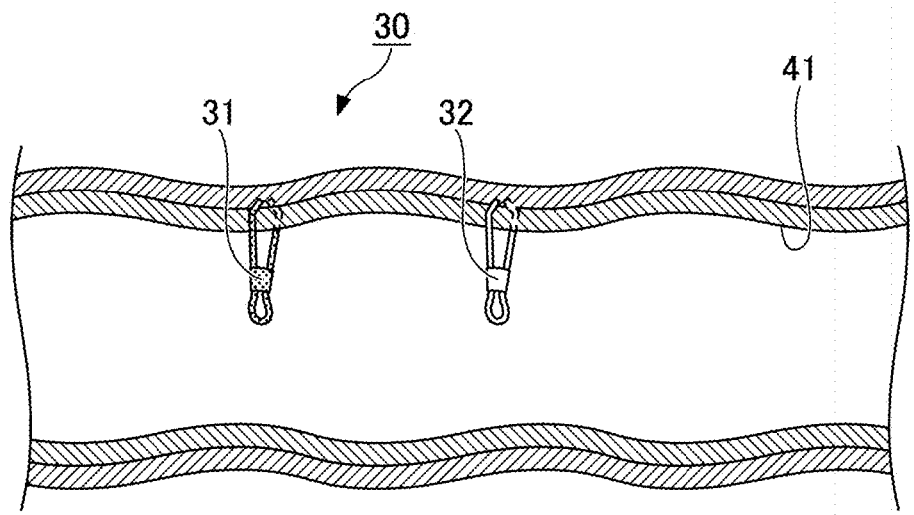
FIG. 15 is a schematic view illustrating an example of use of the endoscope clip set in FIG. 14.

FIG. 15 is a schematic view illustrating an example of use of the endoscope clip set 30 in FIG. 14. The first clip 31 and the second clip 32 are fixed to a mucous membrane 41 of an internal organ, for example, a blood vessel, by a dedicated clip applicator (not illustrated). When the near-infrared light is irradiated from the outside of the blood vessel, the near-infrared fluorescent dye included in the first clip 31 is excited and emits fluorescence. The second clip 32 reflects the fluorescence of the first clip. Thus, both the first clip 31 and the second clip 32 are imaged by the near-infrared camera.

The number of clips included in the endoscope clip set 30 is not limited to two. When two or more clips are used in close proximity at the same internal part of the body, the near-infrared fluorescent dye may be kneaded into only one of the clips, and the reflective substance that reflects the near-infrared fluorescence may be mixed into the other clips.

With the configuration of the third embodiment, it is possible to knead a near-infrared fluorescent dye in one clip and observe fluorescence reflection from another clip. This enables observation and surgery with reduced cost and reduced damage to internal organs.

<Endoscope System>

Figure 16:
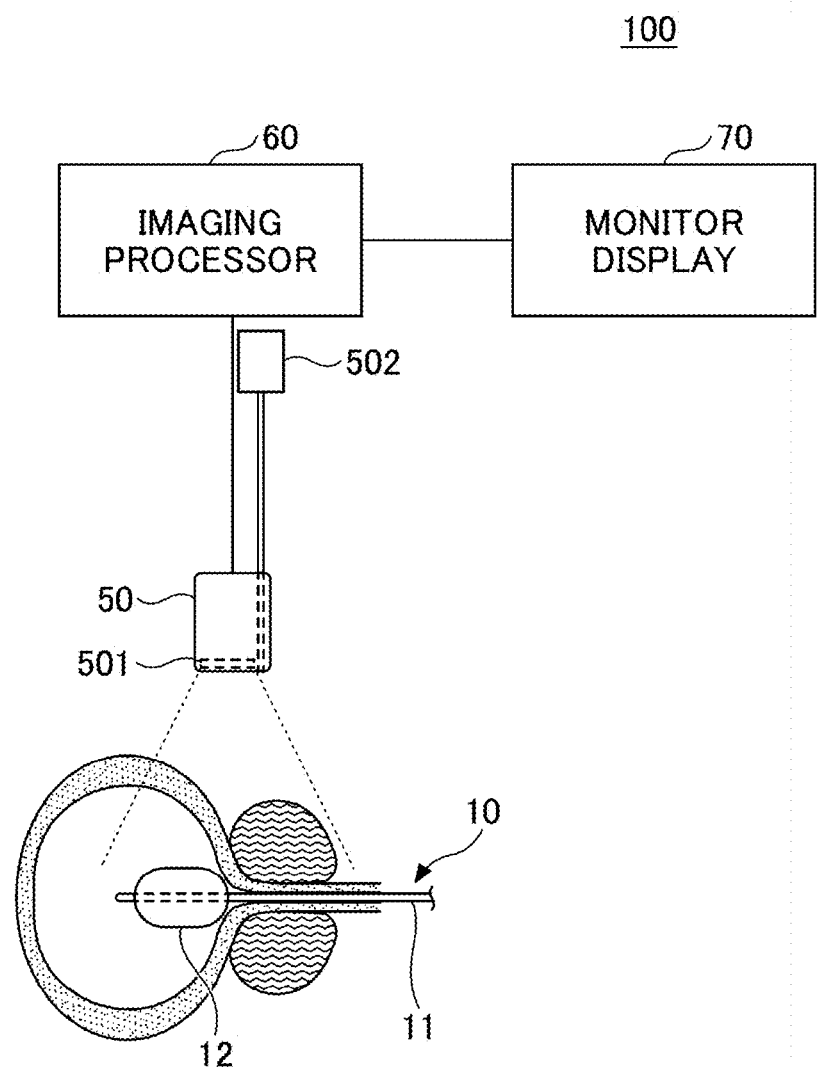
FIG. 16 is a schematic diagram of an endoscope system using an indwelling-type medical device.

FIG. 16 is a schematic diagram of an endoscope system 100 using an indwelling-type medical device. The endoscope system 100 includes an indwelling-type medical device (e.g., balloon catheter 10), a near-infrared camera 50, an imaging processor 60, and a monitor display 70. In this example, the balloon catheter 10 of the first embodiment is used, but the catheter tube set 20 of the second embodiment or the endoscope clip set 30 of the third embodiment may be used.

The near-infrared camera 50 is inserted from a body cavity (in this example, the abdominal cavity) to the vicinity of an internal part of the body to be monitored. The near-infrared camera 50 includes an image sensor 501 having sensitivity to a near-infrared wavelength. An objective lens may be provided on the light receiving surface side of the image sensor. The near-infrared camera 50 may incorporate a near-infrared light source such as an LED as an excitation light source, or may be configured to use a light guide such as an optical fiber for emitting excitation light from an external excitation light source 502. A general near-infrared camera for ICG may be used as the near-infrared camera 50.

When the indwelling-type medical device (for example, the balloon catheter 10) is irradiated with the near-infrared light from the excitation light source 502, fluorescence having a wavelength slightly longer than that of the excitation light is obtained from the catheter tube 11 and the balloon 12. Of such fluorescence, the fluorescence obtained from the balloon 12 is reflected fluorescence, which is fluorescence from the catheter tube 11 that is reflected by the balloon 12.

The near-infrared camera 50 captures an image of the near-infrared fluorescence and its reflection, thereby acquiring the visual information of the balloon catheter 10 on a pixel-by-pixel basis. A near-infrared light cutoff filter for excitation may be provided on the light receiving surface of the image sensor of the near-infrared camera 50. Thus, only the fluorescence and the reflected light from the balloon catheter 10 can be imaged.

The imaging processor 60 performs correction processing, image processing, format conversion, and the like on visual information (for example, a digital electric signal) output from the near-infrared camera 50, and generates an image that can be displayed on the monitor display 70. The monitor display 70 displays the generated image data, thereby displaying an image of the balloon catheter 10 placed in the body.

Although the present disclosure has been described above based on specific examples, the present disclosure is not limited to the above-described examples. In the balloon catheter 10, even when the catheter tube 11 and the balloon 12 are made of the same resin material, the balloon 12 may be configured to contain a reflective substance instead of a near-infrared fluorescent dye. This can reduce the amount of the near-infrared fluorescent material used. The amount of the reflective substance to be added may be adjusted according to the intensity of the reflected fluorescence. In any case, a general near-infrared camera for ICG can be used as it is to detect the presence and position of an assembly not containing a near-infrared fluorescent material.

The present application claims priority to Japanese Patent Application No. 2021-108588 filed on Jun. 30, 2021, the entire content of which is incorporated herein by reference.

DESCRIPTION OF THE REFERENCE NUMERALS 10 balloon catheter (indwelling-type medical device)
11 catheter tube (first assembly)
111 inner layer
112 outer layer
12 balloon (second assembly)
20 catheter tube set (indwelling-type medical device)

21 first catheter tube (first assembly)
22,22A,22B second catheter tube (second assembly)
26 near-infrared light source
30 endoscope clip set (indwelling-type medical device)
31 first clip (first assembly)
32 second clip (second assembly)
50 near-infrared camera
100 endoscope system
501 image sensor
502 excitation light source

The invention claimed is:

1. An indwelling-type medical device, comprising:
a first assembly made of a first material containing a fluorescent dye that emits near-infrared light; and
a second assembly made of a second material that reflects near-infrared light and that reflects the near-infrared light emitted from the first assembly;
wherein the second assembly is positioned outside the first assembly within a range where the near-infrared light emitted from the first assembly reaches.

2. The indwelling-type medical device according to claim 1, wherein the first assembly is made of a resin containing the fluorescent dye, and the second assembly does not contain the fluorescent dye.

3. The indwelling-type medical device according to claim 2, wherein the first assembly is a catheter tube, and the second assembly is a balloon provided on an outer periphery of the catheter tube.

4. The indwelling-type medical device according to claim 3, wherein the second assembly includes bismuth carbonate, barium sulfate, silicon oxide, titanium oxide, bismuth oxide, zirconium oxide, bismuth nitrate, fluororesin, or polytetrafluoroethylene in the second material.

5. The indwelling-type medical device according to claim 2, wherein the first assembly is a first catheter tube, and the second assembly is a second catheter tube that is provided in parallel with the first catheter tube.

6. The indwelling-type medical device according to claim 5 wherein the second assembly includes bismuth carbonate, barium sulfate, silicon oxide, titanium oxide, bismuth oxide, zirconium oxide, bismuth nitrate, fluororesin, or polytetrafluoroethylene in the second material.

7. The indwelling-type medical device according to claim 2, wherein the indwelling-type medical device is an endoscopic clip set, the first assembly is one clip of the endoscopic clip set, and the second assembly is another clip of the endoscopic clip set.

8. The indwelling-type medical device according to claim 7, wherein the second assembly includes bismuth carbonate, barium sulfate, silicon oxide, titanium oxide, bismuth oxide, zirconium oxide, bismuth nitrate, fluororesin, or polytetrafluoroethylene in the second material.

9. The indwelling-type medical device according to claim 2, wherein the second assembly includes bismuth carbonate, barium sulfate, silicon oxide, titanium oxide, bismuth oxide, zirconium oxide, bismuth nitrate, fluororesin, or polytetrafluoroethylene in the second material.

10. The indwelling-type medical device according to claim 1, wherein the first assembly is a catheter tube, and the second assembly is a balloon provided on an outer periphery of the catheter tube.

11. The indwelling-type medical device according to claim 1, wherein the first assembly is a first catheter tube, and the second assembly is a second catheter tube that is provided in parallel with the first catheter tube.

12. The indwelling-type medical device according to claim 1, wherein the indwelling-type medical device is an endoscopic clip set, the first assembly is one clip of the endoscopic clip set, and the second assembly is another clip of the endoscopic clip set.

13. The indwelling-type medical device according to claim 1, wherein the second assembly includes bismuth carbonate, barium sulfate, silicon oxide, titanium oxide, bismuth oxide, zirconium oxide, bismuth nitrate, fluororesin, or polytetrafluoroethylene in the second material.

14. An endoscope system comprising:
an indwelling-type medical device comprising:
a first assembly made of a first material containing a fluorescent dye that emits near-infrared light;
a second assembly made of a second material that reflects near-infrared light and that reflects the near-infrared light emitted from the first assembly;
wherein the second assembly is positioned outside the first assembly within a range where the near-infrared light emitted from the first assembly reaches;
an excitation light source configured to excite a fluorescent dye; and
an image sensor configured to detect the near-infrared light emitted from the first assembly and reflected near-infrared light reflected by the second assembly to acquire an image of the indwelling-type medical device.

15. The endoscope system according to claim 14, further comprising:
a monitor display configured to display the image acquired by the image sensor.

16. The endoscope system according to claim 14, wherein the first assembly is made of a resin containing the fluorescent dye, and the second assembly does not contain the fluorescent dye.

17. The endoscope system according to claim 14, wherein the first assembly is a catheter tube, and the second assembly is a balloon provided on an outer periphery of the catheter tube.

18. The endoscope system according to claim 14, wherein the first assembly is a first catheter tube, and the second assembly is a second catheter tube that is provided in parallel with the first catheter tube.

19. The endoscope system according to claim 14, wherein the indwelling-type medical device is an endoscopic clip set, the first assembly is one clip of the endoscopic clip set, and the second assembly is another clip of the endoscopic clip set.

20. The endoscope system according to claim 14, wherein the second assembly includes bismuth carbonate, barium sulfate, silicon oxide, titanium oxide, bismuth oxide, zirconium oxide, bismuth nitrate, fluororesin, or polytetrafluoroethylene in the second material.

* * * * *